(12) United States Patent
Teraoka

(10) Patent No.: US 9,104,013 B2
(45) Date of Patent: Aug. 11, 2015

(54) IMAGING LENS

(71) Applicant: Hiroyuki Teraoka, Shenzhen (CN)

(72) Inventor: Hiroyuki Teraoka, Shenzhen (CN)

(73) Assignee: AAC TECHNOLOGIES PTE. LTD., Singapore (SG)

( * ) Notice: Subject to any disclaimer, the term of this patent is extended or adjusted under 35 U.S.C. 154(b) by 0 days.

(21) Appl. No.: 14/193,115

(22) Filed: Feb. 28, 2014

(65) Prior Publication Data

US 2014/0233111 A1    Aug. 21, 2014

(30) Foreign Application Priority Data

Feb. 20, 2013    (JP) .................................. 2013-30583

(51) Int. Cl.
  *G02B 9/60*    (2006.01)
  *G02B 13/00*    (2006.01)
(52) U.S. Cl.
  CPC .............. *G02B 13/0045* (2013.01); *G02B 9/60* (2013.01)

(58) Field of Classification Search
  CPC .............. G02B 9/60; G02B 9/62; G02B 9/64; G02B 13/0045
  USPC .................. 359/713, 714, 754–758, 763, 764
  See application file for complete search history.

(56) References Cited

U.S. PATENT DOCUMENTS

| 2013/0222893 | A1* | 8/2013 | Ko ................................ 359/356 |
| 2014/0002909 | A1* | 1/2014 | Yonezawa ..................... 359/714 |
| 2014/0063596 | A1* | 3/2014 | Jung et al. ..................... 359/357 |

* cited by examiner

*Primary Examiner* — Darryl J Collins
(74) *Attorney, Agent, or Firm* — IPro, Inc.; Na Xu

(57) ABSTRACT

An image lens is disclosed. The image lens includes, arranged in succession from the object side to the image side, an aperture stop S1, a first lens L1 having two convex surfaces and having a positive refractive power, a second lens L2 having a meniscus shape convex toward the object side and having a negative refractive power, a third lens L3 having a positive refractive power, a fourth lens L4 having a meniscus shape convex toward the image side and having a positive refractive power, and a fifth lens L5 having a meniscus shape convex toward the object side and having a negative refractive power.

4 Claims, 11 Drawing Sheets

IMAGING LENS

FIELD OF THE INVENTION

The present invention relates to an imaging lens, and more particularly to an imaging lens which is suitable for installation into an image input device of a portable telephone or personal computer, a digital camera, a CCD camera used for monitoring purposes, a surveying device, or similar.

DESCRIPTION OF RELATED ART

Imaging apparatuses using solid-state image sensing devices such as CCD (Charge-Coupled Device) type image sensors and CMOS (Complementary Metal-Oxide Semiconductor) type image sensors include digital still cameras, digital video cameras, and the like. Imaging apparatuses using such solid-state image sensing devices are suitable for miniaturization, and hence have recently been mounted in compact information terminals such as cellular phone sets.

With increases in the miniaturization and pixel density of solid-state image sensing devices, demands have arisen for smaller and higher-performance imaging lenses to be mounted in these imaging apparatuses. As imaging lenses used for such an application, 4 element/3 group lenses each sequentially including an aperture stop, a first lens group having positive refracting power and including a cemented lens, a second lens group having an aspherical shape, and a third lens group having aspherical shape which are sequentially arranged from the object side is known, which are higher in performance than one or two element lenses. Among such lenses, a lens whose total length (the on-axis length from the aperture stop to the image-side focal point) is small, in particular, is disclosed in, for example, Japanese Patent Application Unexamined Publication (Kokai) No. 2002-228922.

The lens disclosed in Japanese Patent Application Unexamined Publication (Kokai) No. 2002-228922 is of a type which is designed to achieve miniaturization of an imaging lens by having an aperture stop placed nearest to the object side, a cemented lens as the first lens group which is constituted by positive and negative lenses, and aspherical lenses as the second and third lens groups, and letting the first lens group mainly contribute to the refracting power of the whole imaging lens system.

For achieving good performance on aberration correction, an imaging lens with 5 pieces of lens (5P lens) is developed. The imaging lens sequentially includes a first lens having a positive refractive power, a second lens having a negative refractive power, a third lens having a positive refractive power, a fourth lens having a positive refractive power, and a fifth lens having a negative refractive power, from the object side to the image side. Such a 5P lens is disclosed in Japanese Patent Application Unexamined Publication No. 2012-203234. Because the refractive powers of the first, second and third lenses are not distributed fully, the brightness of the lens is inadequate. Another 5P lens is disclosed in Japanese Patent Application Unexamined Publication No. 2011-257447. Such a lens has an expected brightness, but has a poor wide-angle.

Accordingly, an improved imaging lens which can overcome the disadvantages described above is desired.

BRIEF DESCRIPTION OF THE DRAWINGS

Many aspects of the embodiment can be better understood with reference to the following drawings. The components in the drawing are not necessarily drawn to scale, the emphasis instead being placed upon clearly illustrating the principles of the present disclosure. Moreover, in the drawings, like reference numerals designate corresponding parts throughout the several views.

DETAILED DESCRIPTION OF THE EXEMPLARY EMBODIMENTS

The present invention will hereinafter be described in detail with reference to several embodiments.

Figure 1:
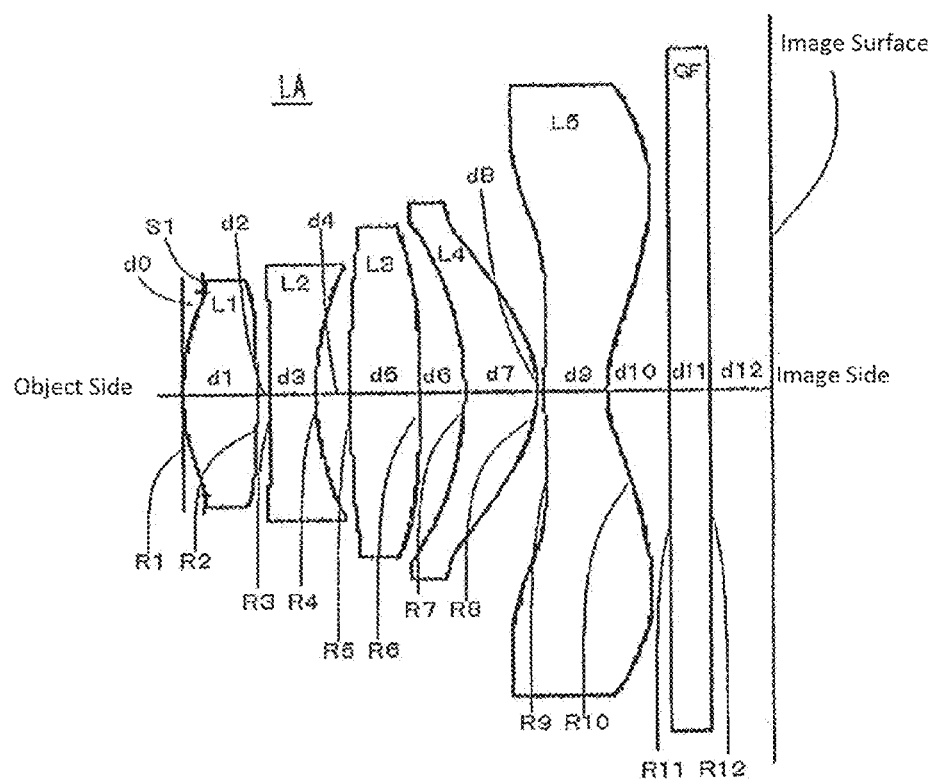
FIG. 1 is an illustrative structure of an image lens related to the present invention.

Referring to FIG. 1, an imaging lens LA related to the present invention includes, from the object side to the image side, an aperture stop S1, a first lens L1, a second lens L2, a third lens L3, a fourth lens L4, and a fifth lens L5. A glass plate GF is arranged between the fifth lens L5 and the image surface. The glass plate GF may be a cover glass, an IR filter, or a low frequency filter. Alternatively, the glass plate may be arranged at other position.

The first lens L1 has a positive refractive power and has two convex surfaces, the second lens L2 has a meniscus shape convex toward the object side and has a negative refractive power, the third lens L3 has a positive refractive power, the fourth lens L4 has a meniscus shape convex toward the image side and has a positive refractive power, and the fifth lens L5 has a meniscus shape convex toward the object side and has a negative refractive power. With the configuration of the refractive powers of the lenses, the image lens LA may be miniaturized. Further, for correcting aberrations appropriately, these five lenses are configured to be aspherical.

The image lens LA satisfies the following conditions (1)~(6):

$$0.66 \leq f1/f \leq 0.90 \quad (1)$$

$$-1.40 \leq f2/f \leq -1.00 \quad (2)$$

$$1.80 \leq f3/f \leq 7.00 \quad (3)$$

$$0.08 \leq |R1/R2| \leq 0.18 \quad (4)$$

$$3.00 \leq |R3/R4| \leq 6.00 \quad (5)$$

$$0.70 \leq |R5/R6| \leq 4.00 \quad (6)$$

Where:
f is the focal length of the image lens LA;
f1 is the focal length of the first lens L1;
f2 is the focal length of the second lens L2;
f3 is the focal length of the third lens L3;
R1 is the curvature radius of the surface of the first lens L1 near the object side;
R2 is the curvature radius of the surface of the first lens L1 near the image side;
R3 is the curvature radius of the surface of the second lens L2 near the object side;
R4 is the curvature radius of the surface of the second lens L2 near the image side;
R5 is the curvature radius of the surface of the third lens L3 near the object side; and
R6 is the curvature radius of the surface of the third lens L3 near the image side.

Condition (1) prescribes the positive refractive power of the first lens L1. If the value excesses the minimum limit, it is better for miniaturizing the image lens LA, but is worse for aberration correction and wide-angle. If the value excesses the maximum limit, it weakens the positive refraction power of the first lens L1 and makes it difficult to miniaturize the image lens LA.

Condition (2) prescribed the negative refractive power of the second lens L2. If the value excesses the minimum limit, it weakens the negative refractive power of the second lens L2, and makes it difficult to correct chromatic aberration. If the value excesses the maximum limit, the negative refractive power of the second lens L2 is too powerful to correct image aberrations. Meanwhile, high level image aberration causes axial eccentricity of the second lens L2, which further results in image distortion.

Condition (3) prescribes the positive refractive power of the third lens L3. If the value excesses the minimum limit, the positive refractive power of the third lens L3 is too powerful to correct image aberrations. Meanwhile, high level image aberration causes axial eccentricity of the third lens L3, which further results in image distortion. If the value excesses the maximum limit, the positive refractive power of the third lens L3 is weakened and it is difficult to miniaturize the image lens LA.

Condition (4) prescribes the curvature radiuses of the two surfaces of the first lens L1, one being near the object side, and the other being near the image side. If the value does not satisfy this condition, it is difficult to correct the high level image aberration with the miniaturization and wide-angle development of the image lens LA.

Condition (5) prescribes the curvature radiuses of the two surfaces of the first lens L2, one being near the object side, and the other being near the image side. If the value does not satisfy this condition, it is difficult to control the negative refractive power of the second lens L2, and it is difficult to correct the axial chromatic aberration, with the miniaturization and wide-angle development of the image lens LA.

Condition (6) prescribes the curvature radiuses of the two surfaces of the first lens L3, one being near the object side, and the other being near the image side. If the value does not satisfy this condition, high level image aberration causes axial eccentricity of the third lens L3, which further results in image distortion.

Further, the image lens LA satisfies the following conditions (7)-(8):

$$0.50 \leq f4/f \leq 0.70 \quad (7)$$

$$-0.60 \leq f5/f \leq -0.40 \quad (8)$$

Where:
f is the focal length of the image lens LA;
f4 is the focal length of the fourth lens L4;
f5 is the focal length of the fifth lens L5.

Condition (7) prescribes the positive refractive power of the fourth lens L4. If the value excesses the minimum limit, the positive refractive power of the fourth lens L4 is too powerful to correct image aberrations. Meanwhile, high level image aberration causes axial eccentricity of the fourth lens L4, which further results in image distortion. If the value excesses the maximum limit, the positive refractive power of the fourth lens L4 is weakened and it is difficult to miniaturize the image lens LA.

The fifth lens L5 and the second lens L2 cooperatively ensure the negative refractive power of the image lens LA. It is better to correct chromatic aberration by enhancing the negative refractive power of the second lens L2, however, if the negative refractive power of the second lens L2 is too much powerful, high level image aberration causes axial eccentricity of the second lens L2, which further results in image distortion. Therefore, the negative refractive power of the fifth lens L5 is controlled by making the negative refractive power of the second lens L2 not too excessive.

Condition (8) prescribes the negative refractive power of the fifth lens L5. If the value excesses the minimum limit, it weakens the negative refractive power of the fifth lens L5, and makes it difficult to correct chromatic aberration. If the value excesses the maximum limit, high level image aberration causes axial eccentricity of the fifth lens L5, which further results in image distortion.

Further, the image lens LA satisfies the following conditions (9)-(10):

$$0.005 \leq d2/f \leq 0.030 \quad (9)$$

$$0.065 \leq d3/f \leq 0.150 \quad (10)$$

Where:

f is the focal length of the image lens LA;

d2 is the axial distance from the surface of the first lens L1 near the image side to the surface of the second lens L2 near the object side;

d3 is the thickness of the second lens L2 along the optic axis.

Condition (9) prescribes relationship between the focal length of the image lens LA and the axial distance from the surface of the first lens L1 near the image side to the surface of the second lens L2 near the object side. If the value does not satisfy this condition, it is difficult to correct the image aberrations, with the miniaturization and wide-angle development of the image lens LA.

Condition (10) prescribes the relationship between the focal length of the image lens LA and the thickness of the second lens L2. If the value does not satisfy this condition, it is difficult to control the refractive power of the second lens L2, and it is difficult to correct chromatic aberration with the miniaturization and wide-angle development of the image lens LA. Meanwhile, high level image aberration causes axial eccentricity of the second lens L2, which further results in image distortion.

Further, the image lens LA satisfies the following conditions (11)-(12):

$$1.50 \leq |R7/R8| \leq 4.00 \quad (11)$$

$$4.00 \leq |R9/R10| \leq 9.00 \quad (12)$$

Where:

R7 is the curvature radius of the surface of the fourth lens L4 near the object side;

R8 is the curvature radius of the surface of the fourth lens L4 near the image side;

R9 is the curvature radius of the surface of the fifth lens L5 near the object side;

R10 is the curvature radius of the surface of the fifth lens L5 near the image side.

Condition (11) prescribes the curvature radiuses of the two surfaces of the fourth lens L4 near the object side and near the image side. If the value does not satisfy this condition, it is difficult to control the refractive power of the fourth lens L4, and it is difficult to correct chromatic aberration with the miniaturization and wide-angle development of the image lens LA. Meanwhile, high level image aberration causes axial eccentricity of the fourth lens L4, which further results in image distortion.

Condition (12) prescribes the curvature radiuses of the two surfaces of the fifth lens L5 near the object side and near the image side. If the value does not satisfy this condition, it is difficult to correct the curvature of field, and it is difficult to ensure better telecentric of the image lens LA.

By virtue of the configurations and conditions set forth in the forgoing description, an improved image lens LA having the characteristics of wide-angle, miniaturization, Fno (F number)$\leq 2.4$ is accordingly obtained.

Before being applied in an image pick-up apparatus, optionally, the lenses L1~L5 may be coated with antireflection film, IR filter film, or be treated by surface hardening. The image lens LA of the present invention may be applied in mobile phone, webcam, personal computer, digital camera, vehicle, optical sense, or monitor.

Hereinafter, detailed embodiments will be described to test and verify the conditions set forth in the above descriptions.

The parameters of the image lens LA are defined as follows, and the unit of each of the distance, radius, and thickness is millimeter (mm)

f: the focal length of the image lens LA;
f1: the focal length of the first lens L1;
f2: the focal lens of the second lens L2;
f3: the focal lens of the third lens L3;
f4: the focal lens of the fourth lens L4;
f5: the focal lens of the fifth lens L5;
Fno: F number
$2\omega$: full visual angle
S1: aperture stop
R: curvature radius
R1: the curvature radius of the object side surface of the first lens L1;
R2: the curvature radius of the image side surface of the first lens L1;
R3: the curvature radius of the object side surface of the second lens L2;
R4: the curvature radius of the image side surface of the second lens L2;
R5: the curvature radius of the object side surface of the third lens L3;
R6: the curvature radius of the image side surface of the third lens L3;
R7: the curvature radius of the object side surface of the fourth lens L4;
R8: the curvature radius of the image side surface of the fourth lens L4;
R9: the curvature radius of the object side surface of the fifth lens L5;
R10: the curvature radius of the image side surface of the fifth lens L5;
R11: the curvature radius of the object side surface of the glass plate GF;
R12: the curvature radius of the image side surface of the glass plate GF;
d: axial thickness of the lens, or distance between lenses;
d0: the distance from the aperture stop S1 to the object side surface of the first lens L1;
d1: the axial thickness of the first lens L1;
d2: the distance from the image side surface of the first lens L1 to the object side surface of the second lens L2;
d3: the axial thickness of the second lens L2;
d4: the distance from the image side surface of the second lens L2 to the object side surface of the third lens L3;
d5: the axial thickness of the third lens L3;
d6: the distance from the image side surface of the third lens L3 to the object side surface of the fourth lens L4;
d7: the axial distance of the fourth lens L4;
d8: the distance from the image side surface of the fourth lens L4 to the object side surface of the fifth lens L5;
d9: the axial thickness of the fifth lens L5;
d10: the distance from the image side surface of the fifth lens L5 to the object side surface of the glass plate GF;
d11: the axial thickness of the glass plate GF;
d12: the distance from the image side surface of the glass plate GF to the image surface;
nd: d line refraction index
n1: d line refraction index of the first lens L1;
n2: d line refraction index of the second lens L2;
n3: d line refraction index of the third lens L3;
n4: d line refraction index of the fourth lens L4;
n5: d line refraction index of the fifth lens L5;
n6: d line refraction index of the glass plate GF;
$\upsilon$: abbe number
$\upsilon 1$: abbe number of the first lens L1;

υ2: abbe number of the second lens L2;
υ3: abbe number of the third lens L3;
υ4: abbe number of the fourth lens L4;
υ5: abbe number of the fifth lens L5;
υ6: abbe number of the glass plate GF;
TTL: the distance from the aperture stop to the image surface (total track length);
LB: the distance from the image side surface of the fifth lens L5 to the image surface (including the axial thickness of the glass plate GF);
IH: image height.

$$y=(x^2/R)/[1+\{1-(k+1)(x^2/R^2)\}^{1/2}]+A4x^4+A6x^6+A8x^8+A10x^{10}+A12x^{12}+A14x^{14}+A16x^{16}$$ (Condition 13)

Where, R is the axial curvature radius, k is the conic coefficient, A4~A16 are aspherical coefficients.

Optionally, each aspherical surface of each lens could be obtained according to condition (13). Of course, the aspherical surface may also be obtained according to other condition.

Embodiment 1

Figure 2:
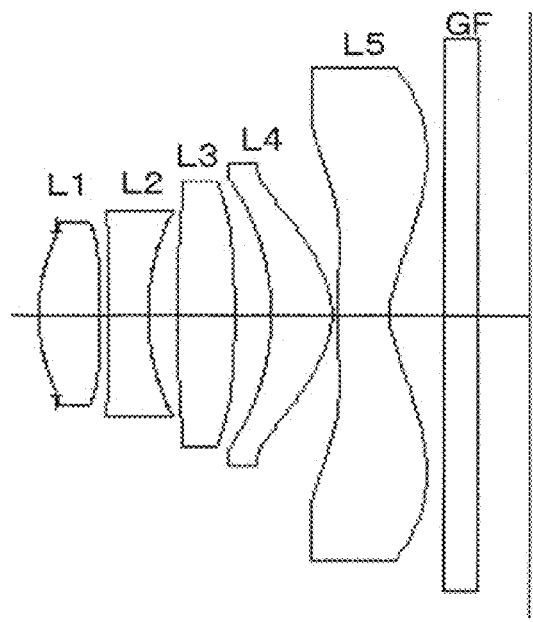
FIG. 2 is a sectional view of an imaging apparatus including the imaging lens according to a first embodiment of the present invention, which is taken along the optical axis direction.

FIG. 2 shows an image lens LA in accordance with Embodiment 1 of the present invention.

TABLE 1

|  | R | d | nd | vd |
|---|---|---|---|---|
| S1 | ∞ | d0 = −0.150 | | |
| R1 | 1.79881 | d1 = 0.555 | nd1 1.5441 | v1 56.12 |
| R2 | −15.35058 | d2 = 0.090 | | |
| R3 | 12.70895 | d3 = 0.360 | nd2 1.6355 | v2 23.97 |
| R4 | 2.19119 | d4 = 0.260 | | |
| R5 | 7.82508 | d5 = 0.530 | nd3 1.5441 | v3 56.12 |
| R6 | −9.46622 | d6 = 0.340 | | |
| R7 | −2.28449 | d7 = 0.560 | nd4 1.5441 | v4 56.12 |
| R8 | −0.75014 | d8 = 0.050 | | |
| R9 | 5.74482 | d9 = 0.485 | nd5 1.5441 | v5 56.12 |
| R10 | 0.74883 | d10 = 0.500 | | |
| R11 | ∞ | d11 = 0.300 | nd6 1.5441 | v6 56.12 |
| R12 | ∞ | d12 = 0.495 | | |

TABLE 2

|  | R | d | nd | vd |
|---|---|---|---|---|
| S1 | ∞ | d0 = −0.120 | | |
| R1 | 1.54221 | d1 = 0.640 | nd1 1.5441 | v1 56.12 |
| R2 | −12.75467 | d2 = 0.050 | | |
| R3 | 12.90064 | d3 = 0.260 | nd2 1.6355 | v2 23.97 |
| R4 | 2.22425 | d4 = 0.340 | | |
| R5 | 33.00891 | d5 = 0.370 | nd3 1.5441 | v3 56.12 |
| R6 | −11.00300 | d6 = 0.485 | | |
| R7 | −2.15212 | d7 = 0.590 | nd4 1.5441 | v4 56.12 |
| R8 | −0.79044 | d8 = 0.055 | | |
| R9 | 5.76220 | d9 = 0.410 | nd5 1.5441 | v5 56.12 |
| R10 | 0.75500 | d10 = 0.500 | | |
| R11 | ∞ | d11 = 0.300 | nd6 1.5441 | v6 56.12 |
| R12 | ∞ | d12 = 0.500 | | |

Figure 3:
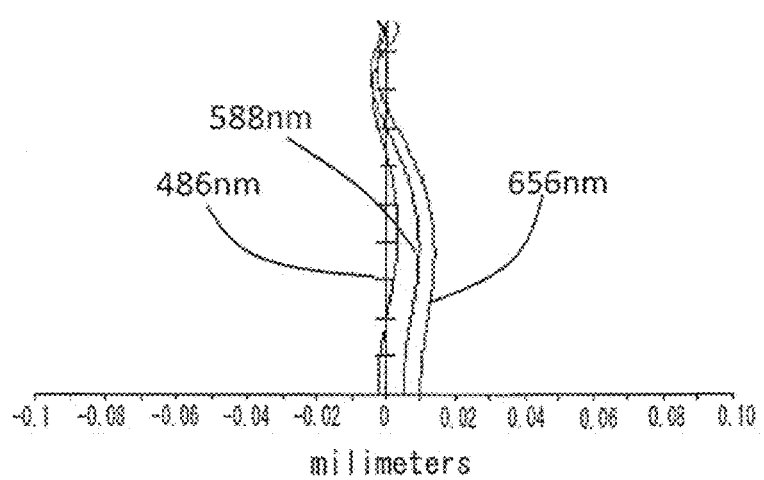
FIG. 3 is an aberration diagram showing spherical aberration (axial chromatic aberration) of the image lens of the first embodiment.
Figure 4:
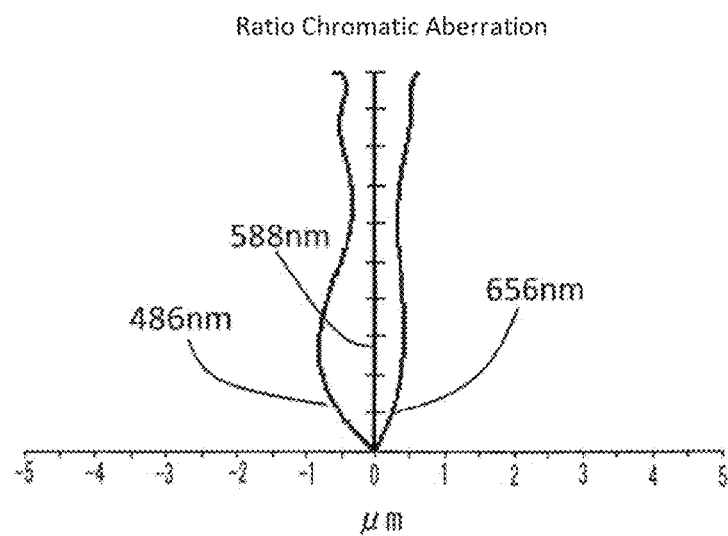
FIG. 4 is a ratio chromatic aberration diagram of the image lens of the first embodiment.
Figure 5:
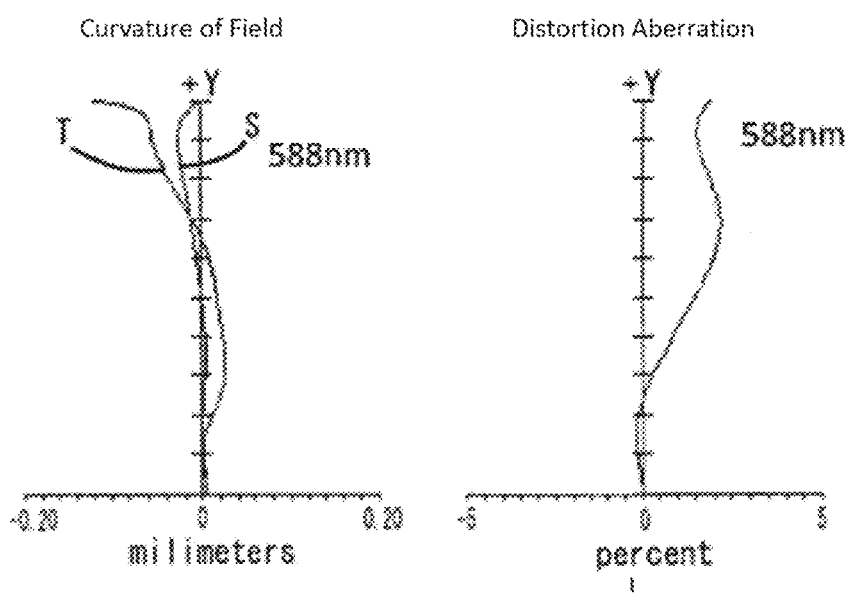
FIG. 5 is an aberration diagram showing the astigmatism and the distortion of the imaging lens of the first embodiment.

Referring to Table 1-2, together with Table 11, we will see that the image lens LA satisfies conditions (1)~(12). The spherical aberration (axial chromatic aberration) of the image lens LA of embodiment 1 is shown in FIG. 3. The ratio chromatic aberration is shown in FIG. 4. The curvature of field and the distortion aberration are shown in FIG. 5. By virtue of the configuration, the image lens LA of Embodiment 1 has the characteristics of wide-angle, miniaturization, 2ω=79.1°, TTL=4.525 mm, and Fno=2.2.

Embodiment 2

Figure 6:
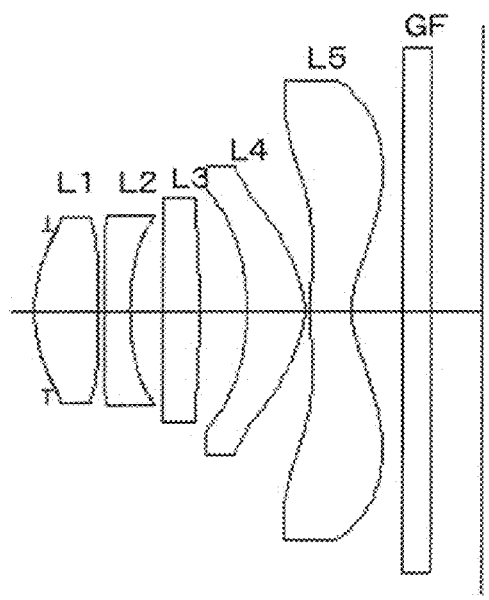
FIG. 6 is a sectional view of an imaging apparatus including the imaging lens according to a second embodiment of the present invention, which is taken along the optical axis direction.

FIG. 6 shows an image lens LA in accordance with Embodiment 2 of the present invention.

TABLE 3

|  | R | d | nd | vd |
|---|---|---|---|---|
| S1 | ∞ | d0 = −0.120 | | |
| R1 | 1.54221 | d1 = 0.640 | nd1 1.5441 | v1 56.12 |
| R2 | −12.75467 | d2 = 0.050 | | |
| R3 | 12.90064 | d3 = 0.260 | nd2 1.6355 | v2 23.97 |
| R4 | 2.22425 | d4 = 0.340 | | |
| R5 | 33.00891 | d5 = 0.370 | nd3 1.5441 | v3 56.12 |
| R6 | −11.00300 | d6 = 0.485 | | |
| R7 | −2.15212 | d7 = 0.590 | nd4 1.5441 | v4 56.12 |
| R8 | −0.79044 | d8 = 0.055 | | |
| R9 | 5.76220 | d9 = 0.410 | nd5 1.5441 | v5 56.12 |
| R10 | 0.75500 | d10 = 0.500 | | |
| R11 | ∞ | d11 = 0.300 | nd6 1.5441 | v6 56.12 |
| R12 | ∞ | d12 = 0.500 | | |

TABLE 4

|  | k | A4 | A6 | A8 | A10 | A12 | A14 | A16 |
|---|---|---|---|---|---|---|---|---|
| R1 | −8.6759E−01 | 1.2023E−02 | −4.6045E−03 | −3.3458E−02 | 4.1005E−02 | 8.8762E−03 | −1.5201E−01 | 1.0250E−01 |
| R2 | −4.5447E+02 | −4.1819E−02 | −6.7246E−02 | 3.7634E−02 | −5.9607E−02 | 4.9968E−02 | 4.6079E−02 | −4.1423E−02 |
| R3 | 1.1943E+02 | −2.4686E−02 | −8.4559E−02 | 1.1848E−01 | −6.3233E−02 | 7.6654E−02 | 1.2097E−02 | −3.1586E−02 |
| R4 | 2.7057E−01 | −6.9241E−03 | 3.1396E−02 | 6.3328E−02 | −7.7813E−02 | 7.9283E−02 | 2.8929E−03 | −1.3551E−02 |
| R5 | −4.1160E+02 | −1.2914E−02 | −1.0187E−02 | 1.8485E−02 | 0.0000E+00 | 0.0000E+00 | 0.0000E+00 | 0.0000E+00 |
| R6 | −7.2716E+01 | −1.1487E−02 | 1.1134E−02 | 3.7420E−03 | 0.0000E+00 | 0.0000E+00 | 0.0000E+00 | 0.0000E+00 |
| R7 | 1.1474E+00 | 7.5871E−03 | −4.0194E−02 | 5.8991E−02 | −1.8543E−02 | −1.2172E−03 | −1.2343E−03 | 5.4304E−04 |
| R8 | −4.2813E+00 | −1.1581E−01 | 4.6431E−02 | −1.5514E−02 | 1.0867E−02 | −1.1005E−03 | −5.2043E−05 | −2.2753E−04 |
| R9 | 5.7526E+00 | −1.2565E−01 | 2.4357E−02 | 3.9315E−04 | −4.7095E−04 | 1.1723E−05 | 1.3332E−05 | −2.9767E−06 |
| R10 | −6.4928E+00 | −6.7052E−02 | 2.0099E−02 | −5.3892E−03 | 7.8402E−04 | −4.1807E−05 | −3.7905E−06 | 4.2913E−07 |

Figure 7:
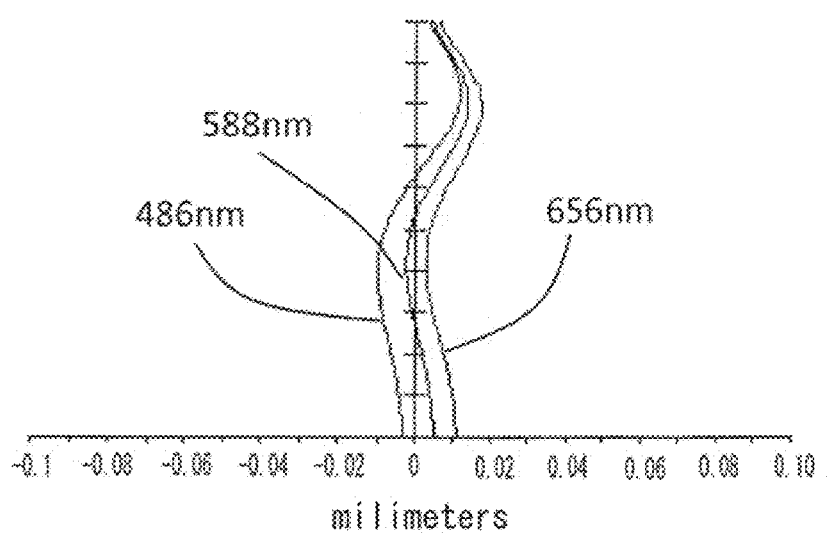
FIG. 7 is an aberration diagram showing spherical aberration (axial chromatic aberration) of the image lens of the second embodiment.
Figure 8:
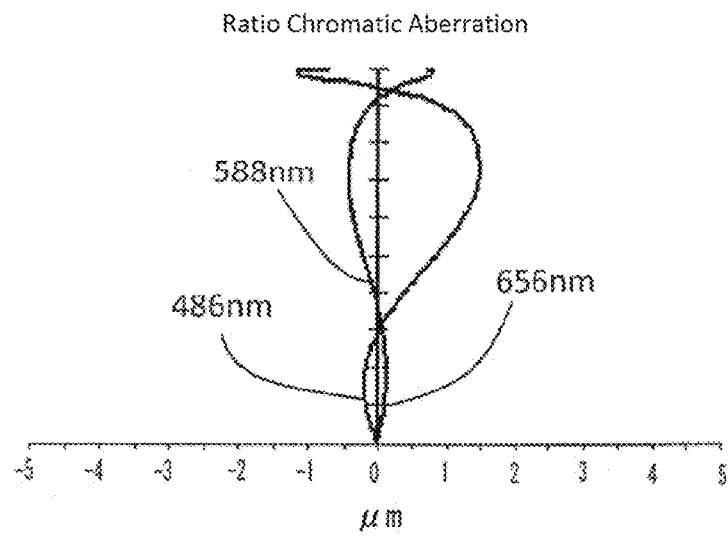
FIG. 8 is a ratio chromatic aberration diagram of the image lens of the second embodiment.
Figure 9:
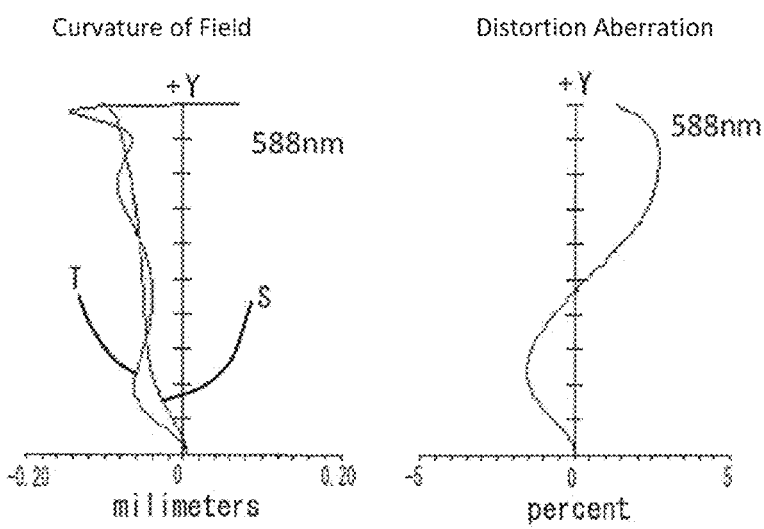
FIG. 9 is an aberration diagram showing the astigmatism and the distortion of the imaging lens of the second embodiment.

Referring to Tables 3-4, and together with Table 11, the image lens LA of Embodiment 2 satisfies conditions (1)~(12). The spherical aberration (axial chromatic aberration) of the image lens LA of embodiment 2 is shown in FIG. 7. The ratio chromatic aberration is shown in FIG. 8. The curvature of field and the distortion aberration are shown in FIG. 9. By virtue of the configuration, the image lens LA of Embodiment 2 has the characteristics of wide-angle, miniaturization, $2\omega=73°$, TTL=4.500 mm, and Fno=2.4.

Embodiment 3

Figure 10:
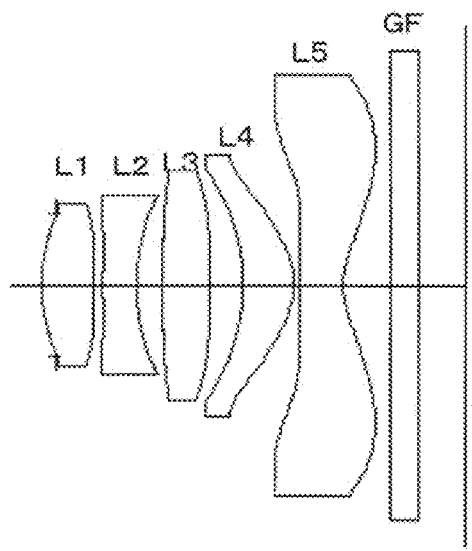
FIG. 10 is a sectional view of an imaging apparatus including the imaging lens according to a third embodiment of the present invention, which is taken along the optical axis direction.

FIG. 10 shows an image lens LA in accordance with Embodiment 3 of the present invention.

TABLE 5

|  | R | d | nd |  | vd |  |
|---|---|---|---|---|---|---|
| S1 | ∞ | d0 = −0.150 |  |  |  |  |
| R1 | 1.79270 | d1 = 0.565 | nd1 | 1.5441 | v1 | 56.12 |
| R2 | −20.59060 | d2 = 0.090 |  |  |  |  |
| R3 | 12.38887 | d3 = 0.360 | nd2 | 1.6355 | v2 | 23.97 |
| R4 | 2.32164 | d4 = 0.265 |  |  |  |  |
| R5 | 7.94105 | d5 = 0.520 | nd3 | 1.5441 | v3 | 56.12 |
| R6 | −9.92333 | d6 = 0.350 |  |  |  |  |
| R7 | −2.27433 | d7 = 0.550 | nd4 | 1.5441 | v4 | 56.12 |
| R8 | −0.76391 | d8 = 0.050 |  |  |  |  |
| R9 | 5.79388 | d9 = 0.475 | nd5 | 1.5441 | v5 | 56.12 |
| R10 | 0.75913 | d10 = 0.500 |  |  |  |  |
| R11 | ∞ | d11 = 0.300 | nd6 | 1.5441 | v6 | 56.12 |
| R12 | ∞ | d12 = 0.520 |  |  |  |  |

TABLE 6

|  | k | A4 | A6 | A8 | A10 | A12 | A14 | A16 |
|---|---|---|---|---|---|---|---|---|
| R1 | −6.4201E−01 | 8.4992E−03 | −9.2351E−03 | −5.0193E−02 | 2.0267E−02 | −4.7726E−03 | −1.5248E−01 | 1.1530E−01 |
| R2 | 1.2940E+02 | −5.6253E−02 | −7.7557E−02 | 2.7533E−02 | −6.9768E−02 | 4.0778E−02 | 3.9567E−02 | −4.2979E−02 |
| R3 | −1.1486E+03 | −5.1835E−02 | −8.7628E−02 | 1.1579E−01 | −6.5637E−02 | 7.5713E−02 | 1.1254E−02 | −3.6374E−02 |
| R4 | −1.4598E+00 | −2.7484E−02 | 2.6883E−02 | 6.4310E−02 | 7.2871E−02 | −5.6664E−03 | −2.0500E−02 |  |
| R5 | −8.1008E+01 | −1.0521E−02 | −5.6174E−03 | 1.2263E−02 | 0.0000E+00 | 0.0000E+00 | 0.0000E+00 | 0.0000E+00 |
| R6 | 3.2404E+01 | −1.9524E−02 | 5.2429E−04 | −1.7717E−03 | 0.0000E+00 | 0.0000E+00 | +0.0000E+00 | 0.0000E+00 |
| R7 | 1.4927E+00 | 3.1228E−02 | −5.2040E−02 | 5.6521E−02 | −1.7393E−02 | 2.6175E−04 | −3.5432E−04 | 1.0389E−03 |
| R8 | −3.8468E+00 | −1.2023E−01 | 4.8011E−02 | −1.4587E−02 | 1.1250E−02 | −9.3358E−03 | 1.9753E−05 | −1.8652E−04 |
| R9 | 5.8046E+00 | −1.2655E−01 | 2.4097E−02 | 3.6496E−04 | −4.7028E−04 | 1.3786E−05 | 1.4450E−05 | −2.5152E−06 |
| R10 | −5.8780E+00 | −6.4569E−02 | 2.0197E−02 | −5.3573E−03 | 7.8795E−04 | −4.1192E−05 | −3.6781E−06 | 4.5121E−07 |

Figure 11:
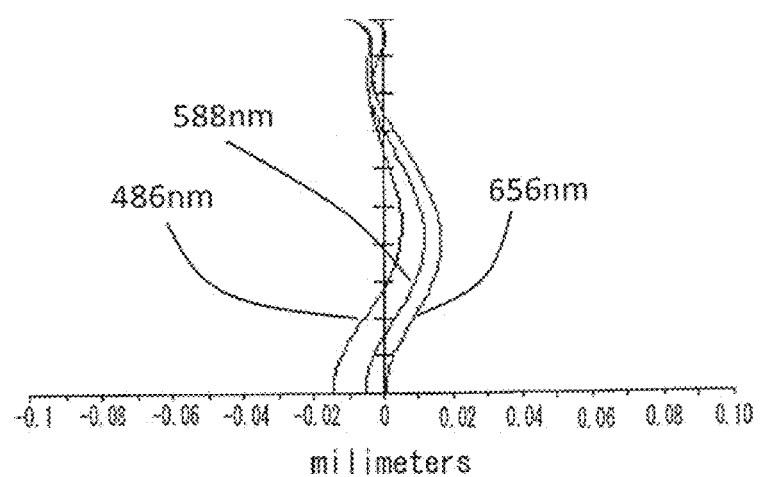
FIG. 11 is an aberration diagram showing spherical aberration (axial chromatic aberration) of the image lens of the third embodiment.
Figure 12:
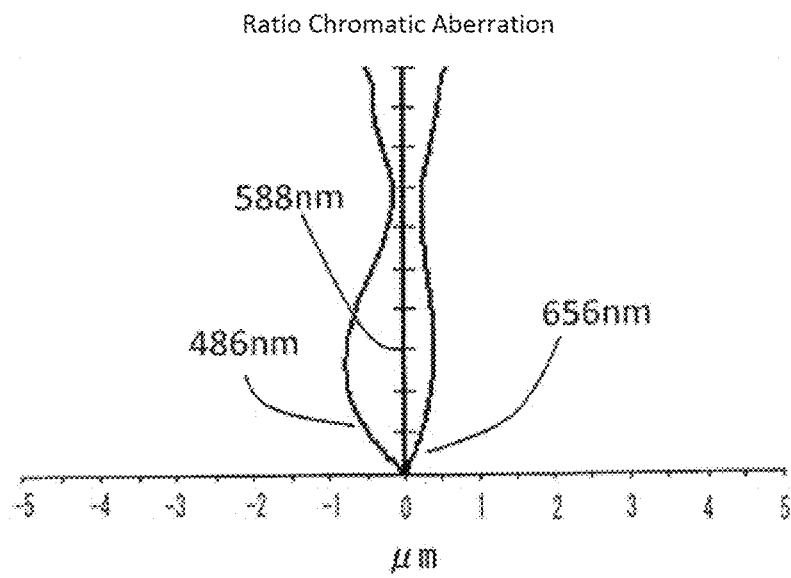
FIG. 12 is a ratio chromatic aberration diagram of the image lens of the third embodiment.
Figure 13:
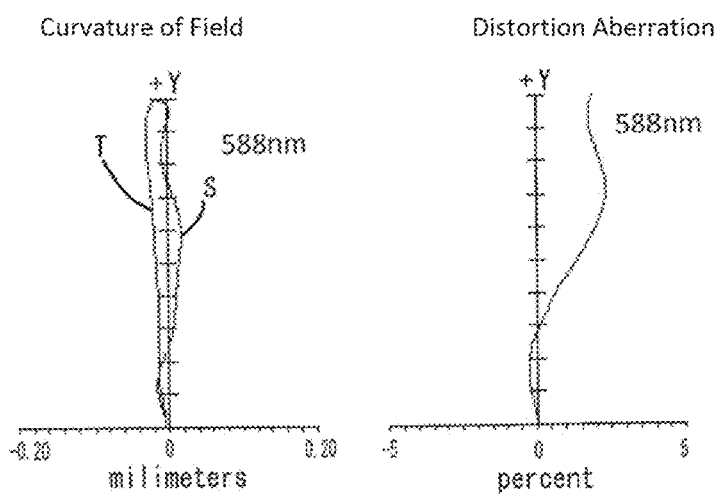
FIG. 13 is an aberration diagram showing the astigmatism and the distortion of the imaging lens of the third embodiment.

Referring to Tables 5-6, and together with Table 11, the image lens LA of Embodiment 3 satisfies conditions (1)~(12). The spherical aberration (axial chromatic aberration) of the image lens LA of embodiment 3 is shown in FIG. 11. The ratio chromatic aberration is shown in FIG. 12. The curvature of field and the distortion aberration are shown in FIG. 13. By virtue of the configuration, the image lens LA of Embodiment 3 has the characteristics of wide-angle, miniaturization, $2\omega=78.0°$, TTL=4.545 mm, and Fno=2.2.

Embodiment 4

Figure 14:
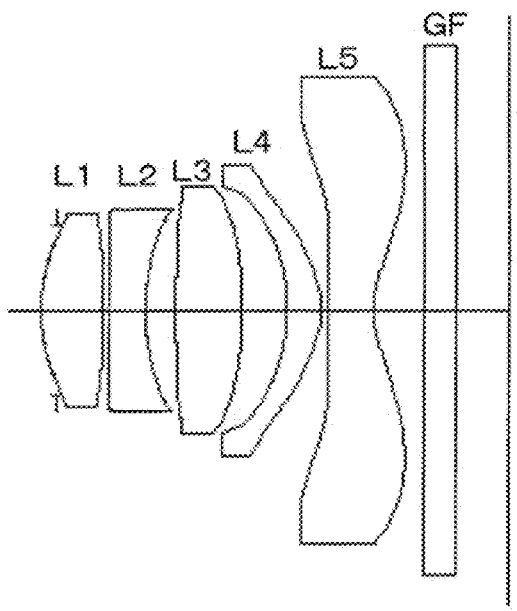
FIG. 14 is a sectional view of an imaging apparatus including the imaging lens according to a fourth embodiment of the present invention, which is taken along the optical axis direction.

FIG. 14 shows an image lens LA in accordance with Embodiment 4 of the present invention.

TABLE 7

|  | R | d | nd |  | vd |  |
|---|---|---|---|---|---|---|
| S1 | ∞ | d0 = −0.150 |  |  |  |  |
| R1 | 1.71004 | d1 = 0.600 | nd1 | 1.5441 | v1 | 56.12 |
| R2 | −14.23757 | d2 = 0.050 |  |  |  |  |
| R3 | 12.56709 | d3 = 0.360 | nd2 | 1.6355 | v2 | 23.97 |
| R4 | 2.16674 | d4 = 0.300 |  |  |  |  |
| R5 | 15.79575 | d5 = 0.640 | nd3 | 1.5441 | v3 | 56.12 |
| R6 | −5.26527 | d6 = 0.445 |  |  |  |  |
| R7 | −1.99996 | d7 = 0.350 | nd4 | 1.5441 | v4 | 56.12 |
| R8 | −0.79080 | d8 = 0.050 |  |  |  |  |
| R9 | 5.54594 | d9 = 0.445 | nd5 | 1.5441 | v5 | 56.12 |
| R10 | 0.77532 | d10 = 0.500 |  |  |  |  |
| R11 | ∞ | d11 = 0.300 | nd6 | 1.5441 | v6 | 56.12 |
| R12 | ∞ | d12 = 0.505 |  |  |  |  |

TABLE 8

|  | k | A4 | A6 | A8 | A10 | A12 | A14 | A16 |
|---|---|---|---|---|---|---|---|---|
| R1 | −5.6895E−01 | 7.8844E−03 | 7.7456E−03 | −3.6708E−02 | 2.8799E−02 | 7.5249E−04 | −1.4485E−01 | 1.3378E−01 |
| R2 | −1.6543E+02 | −2.3694E−02 | −5.9362E−02 | 4.0741E−02 | −5.7775E−02 | 5.3863E−02 | 5.3407E−02 | −3.1798E−02 |
| R3 | −5.3856E+02 | −3.0650E−01 | −7.0756E−02 | 1.2010E−01 | −6.7939E−02 | 7.2240E−02 | 1.1917E−02 | −2.6352E−02 |
| R4 | −4.0909E−01 | −1.8926E−02 | 2.2930E−02 | 5.7662E−02 | −82444E−02 | 7.5386E−02 | −1.1097E−03 | −1.8408E−02 |
| R5 | −1.4684E+01 | −7.0097E−03 | −4.5025E−03 | 1.8693E−02 | 0.0000E+00 | 0.0000E+00 | 0.0000E+00 | 0.0000E+00 |
| R6 | 1.7110E+01 | −3.2237E−02 | −3.6052E−04 | 4.0023E−03 | 0.0000E+00 | 0.0000E+00 | 0.0000E+00 | 0.0000E+00 |
| R7 | 1.7011E+00 | 1.1772E−02 | −5.0052E−02 | 5.4622E−02 | −1.9319E−02 | 4.4733E−06 | 5.3842E−04 | 1.9409E−03 |
| R8 | −4.4497E+00 | −1.1327E−01 | 4.6664E−02 | −1.5077E−02 | 1.1005E−02 | −1.1498E−03 | −14936E−04 | −3.0432E−04 |
| R9 | 5.9229E+00 | −1.2486E−01 | 2.3992E−02 | 2.8582E−04 | −4.9762E−04 | 6.1286E−06 | 1.3083E−05 | −2.5123E−06 |
| R10 | −6.5967E+00 | −6.5930E−02 | 2.0365E−02 | −5.3657E−03 | 7.8520E−04 | −4.1459E−05 | −3.6754E−06 | 4.5662E−07 |

Figure 15:
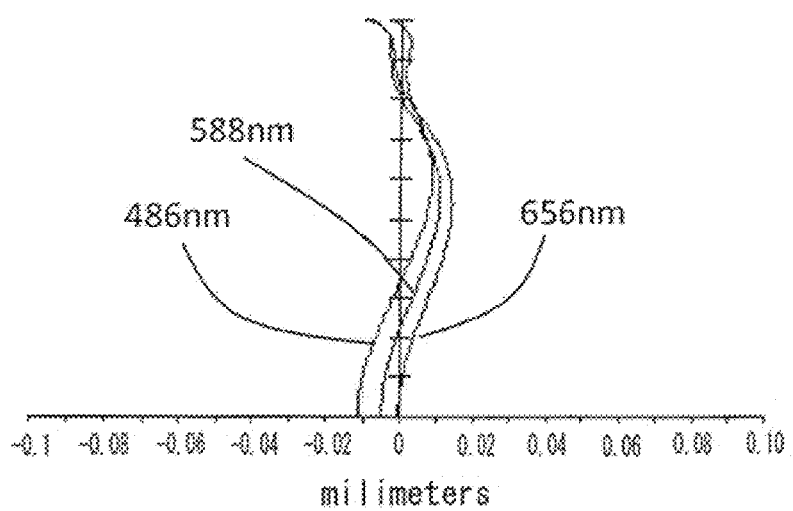
FIG. 15 is an aberration diagram showing spherical aberration (axial chromatic aberration) of the image lens of the fourth embodiment.
Figure 16:
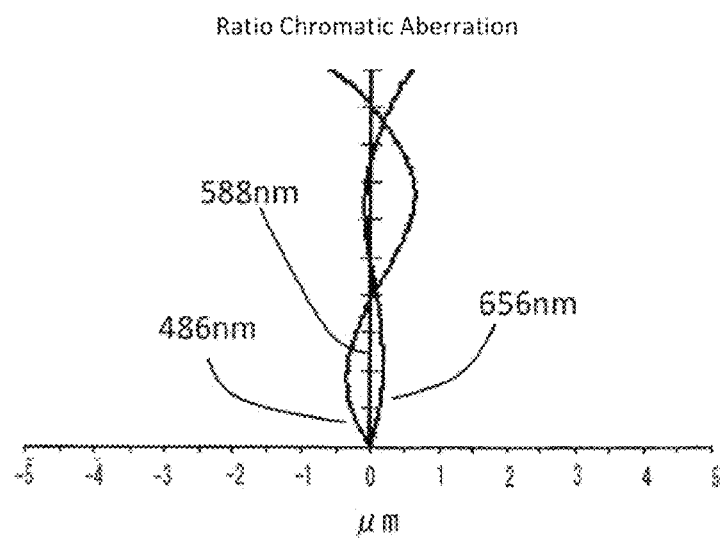
FIG. 16 is a ratio chromatic aberration diagram of the image lens of the fourth embodiment.
Figure 17:
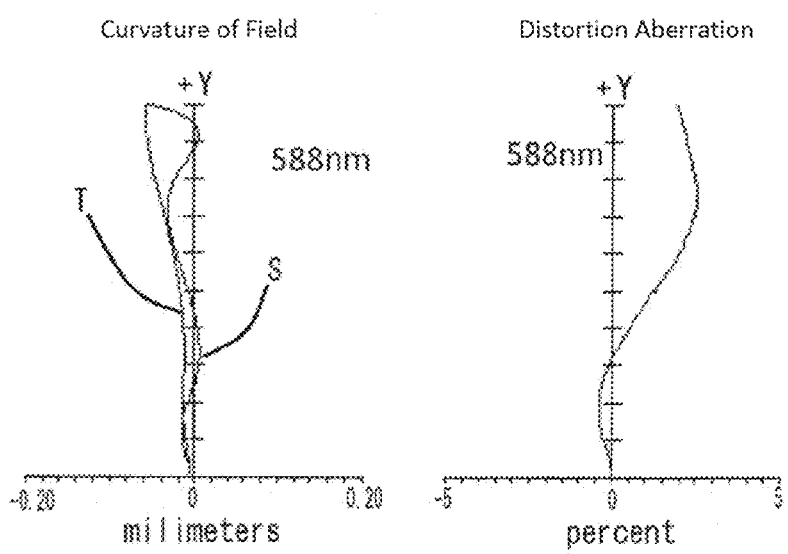
FIG. 17 is an aberration diagram showing the astigmatism and the distortion of the imaging lens of the fourth embodiment.

Referring to Tables 7-8, and together with Table 11, the image lens LA of Embodiment 4 satisfies conditions (1)~(12). The spherical aberration (axial chromatic aberration) of the image lens LA of embodiment 4 is shown in FIG. 15. The ratio chromatic aberration is shown in FIG. 16. The curvature of field and the distortion aberration are shown in FIG. 17. By virtue of the configuration, the image lens LA of Embodiment 4 has the characteristics of wide-angle, miniaturization, $2\omega=75.2°$, TTL=4.545 mm, and Fno=2.2.

Embodiment 5

Figure 18:
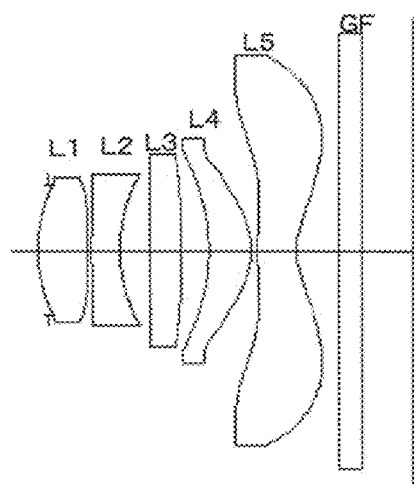
FIG. 18 is a sectional view of an imaging apparatus including the imaging lens according to a fifth embodiment of the present invention, which is taken along the optical axis direction.

FIG. 18 shows an image lens LA in accordance with Embodiment 5 of the present invention.

TABLE 9

| | R | d | | nd | | vd |
|---|---|---|---|---|---|---|
| S1 | ∞ | d0 = | −0.150 | | | |
| R1 | 1.65614 | d1 = | 0.605 | nd1 1.5441 | v1 | 56.12 |
| R2 | −18.31289 | d2 = | 0.050 | | | |
| R3 | 6.43440 | d3 = | 0.340 | nd2 1.6355 | v2 | 23.97 |
| R4 | 2.01053 | d4 = | 0.355 | | | |
| R5 | 56.03063 | d5 = | 0.380 | nd3 1.5441 | v3 | 56.12 |
| R6 | −18.67676 | d6 = | 0.340 | | | |
| R7 | −2.37114 | d7 = | 0.520 | nd4 1.5441 | v4 | 56.12 |
| R8 | −0.78669 | d8 = | 0.070 | | | |
| R9 | 5.87800 | d9 = | 0.475 | nd5 1.5441 | v5 | 56.12 |
| R10 | 0.75939 | d10 = | 0.500 | | | |
| R11 | ∞ | d11 = | 0.300 | nd6 1.5441 | v6 | 56.12 |
| R12 | ∞ | d12 = | 0.615 | | | |

TABLE 10

| | k | A4 | A6 | A8 | A10 | A12 | A14 | A16 |
|---|---|---|---|---|---|---|---|---|
| R1 | −6.6770E−01 | 6.9401E−03 | 2.4205E−03 | −4.4637E−02 | 1.9632E−02 | −8.5167E−03 | −1.5462E−01 | 1.2156E−01 |
| R2 | −4.3337E+02 | −5.4797E−02 | −8.9420E−02 | 2.4258E−02 | −6.6732E−02 | 4.5657E−02 | 4.1137E−02 | −4.9494E−02 |
| R3 | −5.0643E+01 | −5.2079E−02 | −9.3434E−02 | 1.0738E−01 | −7.3691E−02 | 7.0797E−02 | 1.2386E−02 | −2.7316E−02 |
| R4 | −5.8141E−01 | −1.7187E−02 | 2.3952E−02 | 6.0160E−02 | −8.1253E−02 | 7.3670E−02 | −13502E−03 | −1.6693E−02 |
| R5 | −1.0856E+03 | −1.6284E−02 | −1.2280E−02 | 1.8741E−02 | 0.0000E+00 | 0.0000E+00 | 0.0000E+00 | 0.0000E+00 |
| R6 | 1.9942E+02 | −2.0834E−02 | 5.6284E−03 | 3.6947E−04 | 0.0000E+00 | 0.0000E+00 | 0.0000E+00 | 0.0000E+00 |
| R7 | 1.4629E+00 | 4.0029E−02 | −5.2821E−02 | 5.5559E−02 | −1.7417E−02 | 3.3106E−04 | −2.0623E−04 | 1.1533E−03 |
| R8 | −4.0994E+00 | −1.1206E−01 | 5.0696E−02 | −1.3617E−02 | 1.1581E−02 | −8.3457E−04 | 3.4680E−05 | −2.0040E−04 |
| R9 | 5.8812E+00 | −1.2595E−01 | 2.4112E−02 | 3.6226E−04 | −4.7267E−04 | 1.4286E−05 | 1.4447E−05 | −2.5240E−06 |
| R10 | −6.0811E+00 | −6.9529E−02 | 1.9893E−02 | −5.3680E−03 | 7.8527E−04 | −4.2012E−05 | −3.8464E−06 | 4.1990E−07 |

Figure 19:
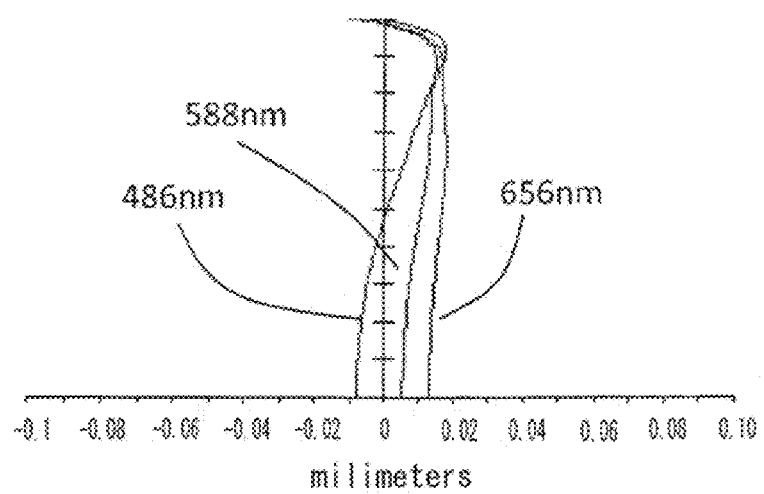
FIG. 19 is an aberration diagram showing spherical aberration (axial chromatic aberration) of the image lens of the fifth embodiment.
Figure 20:
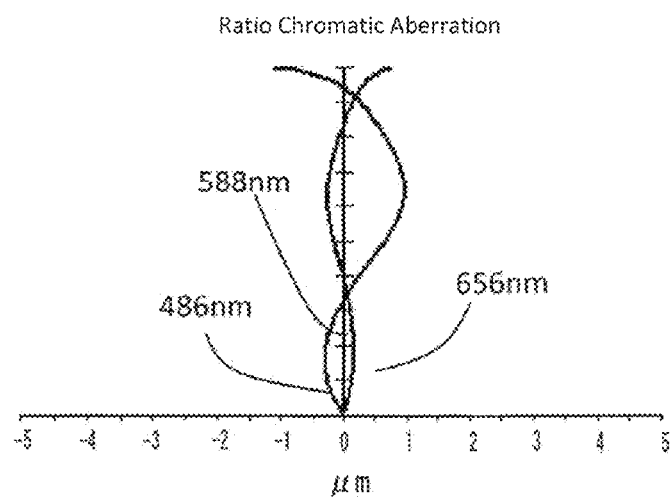
FIG. 20 is a ratio chromatic aberration diagram of the image lens of the fifth embodiment.
Figure 21:
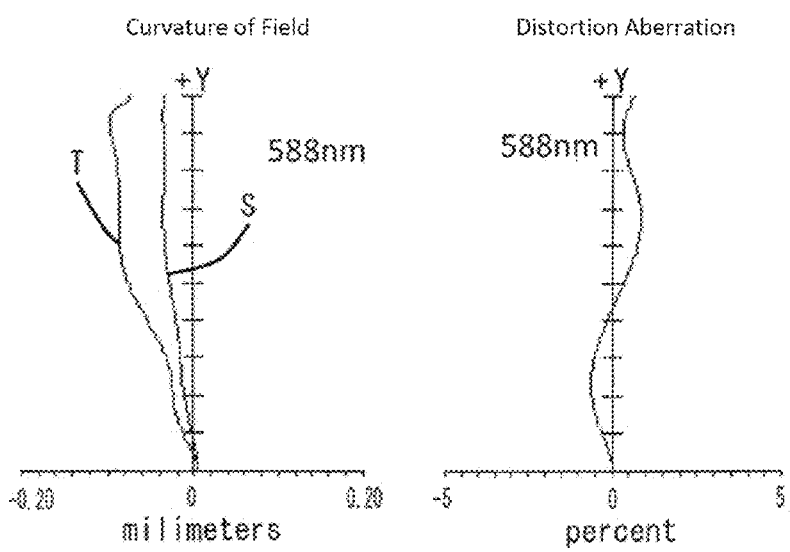
FIG. 21 is an aberration diagram showing the astigmatism and the distortion of the imaging lens of the fifth embodiment.

Referring to Tables 9-10, and together with Table 11, the image lens LA of Embodiment 5 satisfies conditions (1)~(12). The spherical aberration (axial chromatic aberration) of the image lens LA of embodiment 5 is shown in FIG. 19. The ratio chromatic aberration is shown in FIG. 20. The curvature of field and the distortion aberration are shown in FIG. 21. By virtue of the configuration, the image lens LA of Embodiment 5 has the characteristics of wide-angle, miniaturization, $2\omega=73.4°$, TTL=4.550 mm, and Fno=2.4.

Table 11 shows all the parameters of the image lenses of the embodiments corresponding to conditions (1)~(12).

TABLE 11

| | Embodiment 1 | Embodiment 2 | Embodiment 3 | Embodiment 4 | Embodiment 5 |
|---|---|---|---|---|---|
| f1/f | 0.8809 | 0.6733 | 0.8852 | 0.7830 | 0.7393 |
| f2/f | −1.2426 | −1.1190 | −1.3196 | −1.1498 | −1.2427 |
| f3/f | 2.3423 | 3.9866 | 2.3709 | 2.0200 | 6.7574 |
| |R1/R2| | 0.1172 | 0.1209 | 0.0871 | 0.1201 | 0.0904 |
| |R3/R4| | 5.8000 | 5.8000 | 5.3363 | 5.8000 | 3.2003 |
| |R5/R6| | 0.8266 | 3.0000 | 0.8002 | 3.0000 | 3.0000 |

TABLE 11-continued

| | Embodiment 1 | Embodiment 2 | Embodiment 3 | Embodiment 4 | Embodiment 5 |
|---|---|---|---|---|---|
| f4/f | 0.5352 | 0.5221 | 0.5423 | 0.6007 | 0.5082 |
| f5/f | −0.4822 | −0.4309 | −0.4807 | −0.4716 | −0.4341 |
| d2/f | 0.0265 | 0.0131 | 0.0261 | 0.0138 | 0.0131 |
| d3/f | 0.1059 | 0.0681 | 0.1042 | 0.0991 | 0.0891 |
| |R7/R8| | 3.0454 | 2.7227 | 2.9772 | 2.5290 | 3.0141 |
| |R9/R10| | 7.6718 | 7.6320 | 7.6323 | 7.1531 | 7.7404 |
| Fno | 2.20 | 2.40 | 2.20 | 2.20 | 2.40 |
| 2ω | 79.1 | 73.0 | 78.0 | 75.2 | 73.4 |
| f | 3.398 | 3.816 | 3.455 | 3.632 | 3.817 |
| f1 | 2.993 | 2.569 | 3.058 | 2.844 | 2.821 |
| f2 | −4.222 | −4.269 | −4.559 | −4.176 | −4.743 |
| f3 | 7.959 | 15.211 | 8.191 | 7.336 | 25.791 |
| f4 | 1.819 | 1.992 | 1.874 | 2.181 | 1.939 |
| f5 | −1.639 | −1.644 | −1.661 | −1.713 | −1.657 |
| TTL | 4.525 | 4.500 | 4.545 | 4.545 | 4.550 |
| LB | 1.295 | 1.300 | 1.320 | 1.305 | 1.415 |
| IH | 2.856 | 2.856 | 2.856 | 2.856 | 2.856 |

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An image lens comprising, arranged in succession from the object side to the image side:
   an aperture stop S1;
   a first lens L1 having two convex surfaces and having a positive refractive power;
   a second lens L2 having a meniscus shape convex toward the object side and having a negative refractive power;
   a third lens L3 having a positive refractive power;
   a fourth lens L4 having a meniscus shape convex toward the image side and having a positive refractive power;
   a fifth lens L5 having a meniscus shape convex toward the object side and having a negative refractive power;
   wherein the following conditions (1)~(6) are satisfied:

$$0.66 \leq f1/f \leq 0.90 \tag{1}$$

$$-1.40 \leq f2/f \leq -1.00 \tag{2}$$

$$1.80 \leq f3/f \leq 7.00 \tag{3}$$

$$0.08 \leq |R1/R2| \leq 0.18 \tag{4}$$

$$3.00 \leq |R3/R4| \leq 6.00 \tag{5}$$

$$0.70 \leq |R5/R6| \leq 4.00 \tag{6}$$

where,
f is the focal length of the image lens LA;
f1 is the focal length of the first lens L1;
f2 is the focal length of the second lens L2;
f3 is the focal length of the third lens L3;
R1 is the curvature radius of the object side surface of the first lens L1;
R2 is the curvature radius of the image side surface of the first lens L1;
R3 is the curvature radius of the object side surface of the second lens L2;
R4 is the curvature radius of the image side surface of the second lens L2;
R5 is the curvature radius of the object side surface of the third lens L3;
R6 is the curvature radius of the image side surface of the third lens L3.

2. The image lens as claimed in claim 1 further satisfying the following conditions (7)~(8):

$$0.50 \leq f4/f \leq 0.70 \tag{7}$$

$$-0.60 \leq f5/f \leq -0.40 \tag{8}$$

Where:
f is the focal length of the image lens LA;
f4 is the focal length of the fourth lens L4;
f5 is the focal length of the fifth lens L5.

3. The image lens as claimed in claim 2 further satisfying the following conditions (9)~(10):

$$0.005 \leq d2/f \leq 0.030 \tag{9}$$

$$0.065 \leq d3/f \leq 0.150 \tag{10}$$

Where:
f is the focal length of the image lens LA;
d2 is the axial distance from the image side surface of the first lens L1 to the object side surface of the second lens L2;
d3 is the thickness of the second lens L2 along the optic axis.

4. The image lens as claimed in claim 3 further satisfying the following conditions (11)~(12):

$$50 \leq |R7/R8| \leq 4.00 \tag{11}$$

$$4.00 \leq |R9/R10| \leq 9.00 \tag{12}$$

Where:
R7 is the curvature radius of the object side surface of the fourth lens L4;
R8 is the curvature radius of the image side surface of the fourth lens L4;
R9 is the curvature radius of the object side surface of the fifth lens L5;
R10 is the curvature radius of the image side surface of the fifth lens L5.

* * * * *